United States Patent
Steinhafel et al.

(10) Patent No.: US 10,184,690 B2
(45) Date of Patent: Jan. 22, 2019

(54) CONDENSING WATER HEATER AND CONDENSATION CONTROL SYSTEM

(71) Applicants: Michael B. Steinhafel, Madison, WI (US); Jonathan Gourlie, Madison, WI (US)

(72) Inventors: Michael B. Steinhafel, Madison, WI (US); Jonathan Gourlie, Madison, WI (US)

(73) Assignee: Bock Water Heaters, Inc., Madison, WI (US)

( * ) Notice: Subject to any disclaimer, the term of this patent is extended or adjusted under 35 U.S.C. 154(b) by 53 days.

(21) Appl. No.: 15/429,075

(22) Filed: Feb. 9, 2017

(65) Prior Publication Data
US 2018/0224156 A1    Aug. 9, 2018

(51) Int. Cl.
F24H 9/20    (2006.01)
F24H 1/20    (2006.01)
(Continued)

(52) U.S. Cl.
CPC ........... *F24H 9/2035* (2013.01); *F24H 1/205* (2013.01); *F24H 8/00* (2013.01); *F24H 9/0026* (2013.01);
(Continued)

(58) Field of Classification Search
USPC .......................... 122/14.1, 14.2, 14.21, 47–48
See application file for complete search history.

(56) References Cited

U.S. PATENT DOCUMENTS

| | | | | |
|---|---|---|---|---|
| 3,863,708 A | * | 2/1975 | Grimes | B01D 51/10 165/279 |
| 5,533,355 A | * | 7/1996 | Rawlings | E21B 17/18 165/144 |

(Continued)

FOREIGN PATENT DOCUMENTS

| | | |
|---|---|---|
| DE | 3914746 A1 | 11/1989 |
| EP | 0616173 A2 | 9/1994 |

(Continued)

OTHER PUBLICATIONS

Bradford White Corporation brochure "Commercial Gas Ultra High Efficiency Water Heater."

(Continued)

*Primary Examiner* — Steven B McAllister
*Assistant Examiner* — Ko-Wei Lin
(74) *Attorney, Agent, or Firm* — Stiennon & Stiennon (57) ABSTRACT

A water heater with two non-condensing flues and a condensing flue(s) having a system to prevent condensation in the non-condensing flue(s). The downwardly extending first flue is connected by a 180 degree connector to an upwardly extending second flue. Between the non-condensing and the condensing flues is positioned a temperature sensor. A controller receives input from the temperature sensor and is connected to the burner to control the minimum power setting and duration so as to prevent the combustion gases from falling below a temperature at which water will condense at the temperature sensor so no condensation occurs in the first two flues. Burner power settings are minimized near a water tank setpoint to improve efficiency by increasing condensation.

13 Claims, 4 Drawing Sheets

(51) Int. Cl.
*F24H 8/00* (2006.01)
*F24H 9/00* (2006.01)
*F24H 9/18* (2006.01)

(52) U.S. Cl.
CPC ..... *F24H 9/1836* (2013.01); *F24D 2220/042* (2013.01)

(56) References Cited

U.S. PATENT DOCUMENTS

| | | | | |
|---|---|---|---|---|
| 7,290,503 | B2* | 11/2007 | Missoum | F24H 1/206 122/121 |
| 7,559,293 | B2 | 7/2009 | Gordon et al. | |
| 8,807,093 | B2 | 8/2014 | Steinhafel et al. | |
| 2005/0224016 | A1* | 10/2005 | Kemp | F22B 37/565 122/14.2 |
| 2008/0216772 | A1 | 9/2008 | Gordon et al. | |
| 2014/0007823 | A1* | 1/2014 | Qian | F22D 1/36 122/20 B |
| 2016/0033128 | A1* | 2/2016 | Stuxberg | F01K 23/10 60/645 |

FOREIGN PATENT DOCUMENTS

| | | |
|---|---|---|
| EP | 0915304 A2 | 5/1999 |
| EP | 1004833 A2 | 5/2000 |
| EP | 1008819 A2 | 6/2000 |

OTHER PUBLICATIONS

Bock Water Heaters, Inc. brochure "Multi-Flue."
A. O. Smith cyclone brochure (See highlight text p. 7), printed Dec. 2015.

* cited by examiner

CONDENSING WATER HEATER AND CONDENSATION CONTROL SYSTEM

BACKGROUND OF THE INVENTION

The present invention relates to water heaters in general, and more particularly to water heaters with multi-flues, at least one of which is condensing.

Heat exchange between a liquid and a gas is a process which has many industrial and domestic applications. Perhaps one of the most widely used applications of heat exchange between a gas and a liquid is in heating water. Typically a water heater has a tank which holds the water to be heated, and a burner producing combustion gases. The water is heated by the combustion of fuel with air in the burner to produce the combustion gases which heat the water in the tank by passing through one or more flues or tubes which extend through the water tank. Two considerations which are paramount in the design of a water heater are durability and efficiency. To conserve resources and limit the production of carbon dioxide, efficiency has become paramount in all devices using combustion to generate heat. Approximately 7-10% of the heat available in burning a hydrocarbon fuel such as natural gas, or No. 2 fuel oil, is contained in the latent heat of the water produced during combustion. Practically, only 85-89% of the heat of combustion can be transferred without condensing the water produced by combustion. The water as vapor contains the energy necessary for the phase change between liquid and vapor, which for water, is about 1000 Btu/lb. The latent heat of the water vapor in the combustion gas, must be condensed to extract the latent heat. This increases the complexity of the design due to the corrosive nature of liquid water as opposed to steam. Furthermore, it is necessary to control the combustion level to prevent condensation of water before it has reached the flue structures which are designed to condense the steam, and to properly drain the water when it condenses so as to not block the free flow of the combustion gases.

SUMMARY OF THE INVENTION

The invention is an improvement on the water heater described in U.S. Pat. No. 8,807,093 filed on May 19, 2011 and issued on Aug. 19, 2014 which is incorporated herein by reference. The improved water heater includes a system to prevent condensation in a first and a second flue i.e., the system prevents condensation before the flue gases have reached a plurality of third flue structures which are designed to condense water vapor. The third flues are connected to a drain which removes the condensed water from the third flues. The flues are internal to a water heater tank. The flue system has a downwardly fired first flue which is connected by a 180 degree connector to an upwardly extending second flue. The second flue is at least partially lined with metal fins which extend radially inwardly from the inside surface of the second flue to improve heat transfer between the combustion gases and the water heater tank. A structural improvement over the water heater described in U.S. Pat. No. 8,807,093 is that the first and second flues are joined by a connector which is wholly contained within the water tank, rather than having an exterior junction box, so that no heat is lost by a connection which is outside the water heater tank. The upwardly extending second flue opens into a first junction box from which the plurality of tertiary flues extending downward to a second junction box which provides both an exhaust for the combustion gases and a water drain to remove condensation produced by combusting a fuel containing hydrogen.

Water which condenses prematurely in the first or second flues can fill up the connector between the first and second flues blocking or restricting the flow of air through the flues. The water in the connector between the flues will produce an air flow restriction which prevents the burner from igniting. Condensation occurs in the first or second flue when the burner power is set at a low level such that heat transfer in the first and/or the second flue is sufficient to condense at least part of the water vapor before the combustion gases leave the second flue. The water heater of this invention incorporates a temperature sensor at the top of the second flue which monitors the temperature of the combustion gases leaving the second flue. A controller receives input from the temperature sensor and is connected to the burner to control the minimum power setting and duration so as to prevent the combustion gases from the second flue from falling below a temperature at which water will condense.

It is an object of the present invention to provide a condensing water heater which is controlled to maximize the heat which can be extracted by condensing water vapor in the combustion gases while still providing rapid response to hot water demand.

It is an object of the present invention to prevent condensation of water in a flue system of a condensing flue water heater before the condensing section of the flue.

Further objects, features and advantages of the invention will be apparent from the following detailed description when taken in conjunction with the accompanying drawings.

DESCRIPTION OF THE PREFERRED EMBODIMENTS

Figure 1:
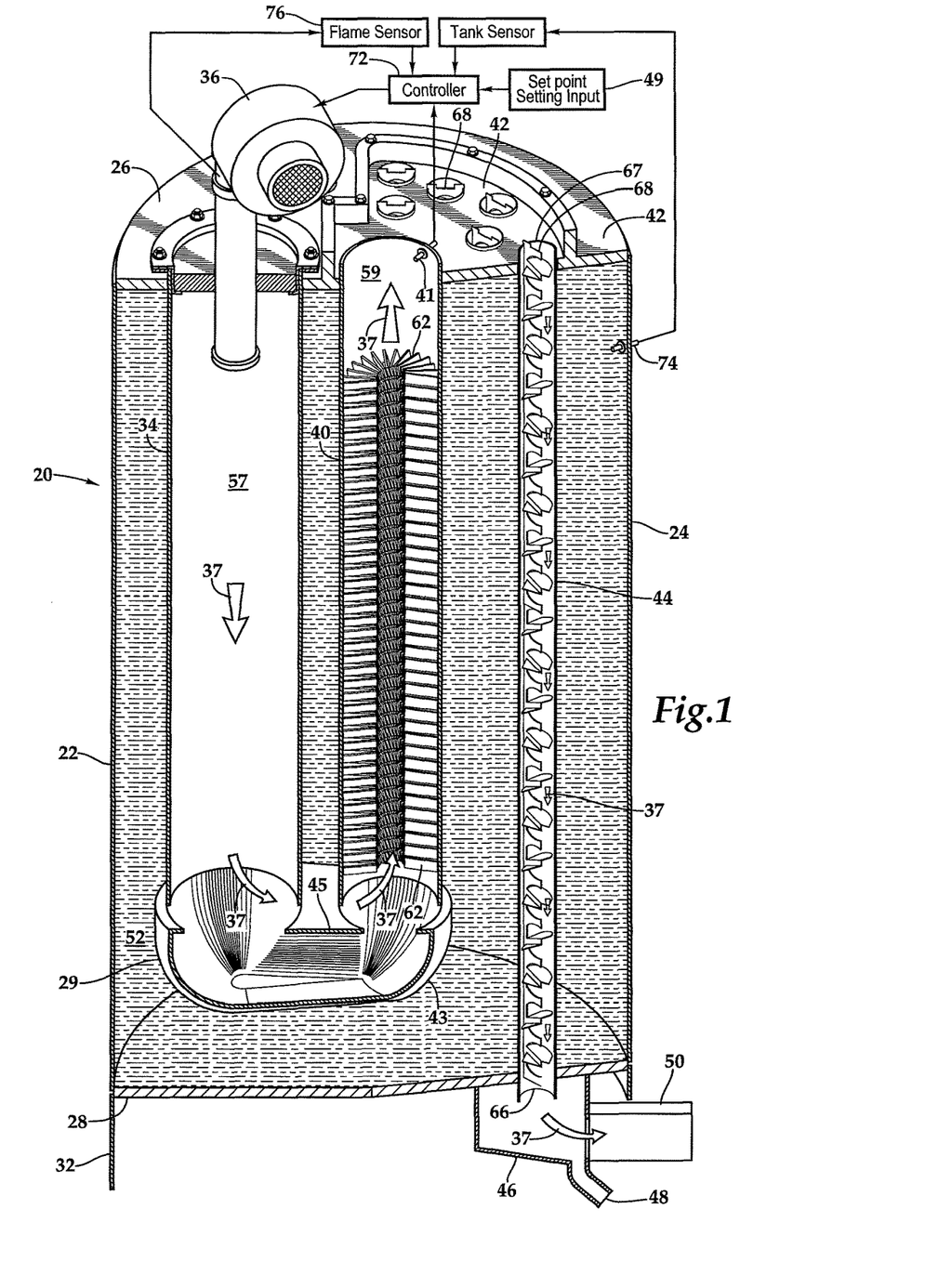
FIG. 1 is a schematic cross-sectional view of the condensing water heater of this invention.
Figure 2:
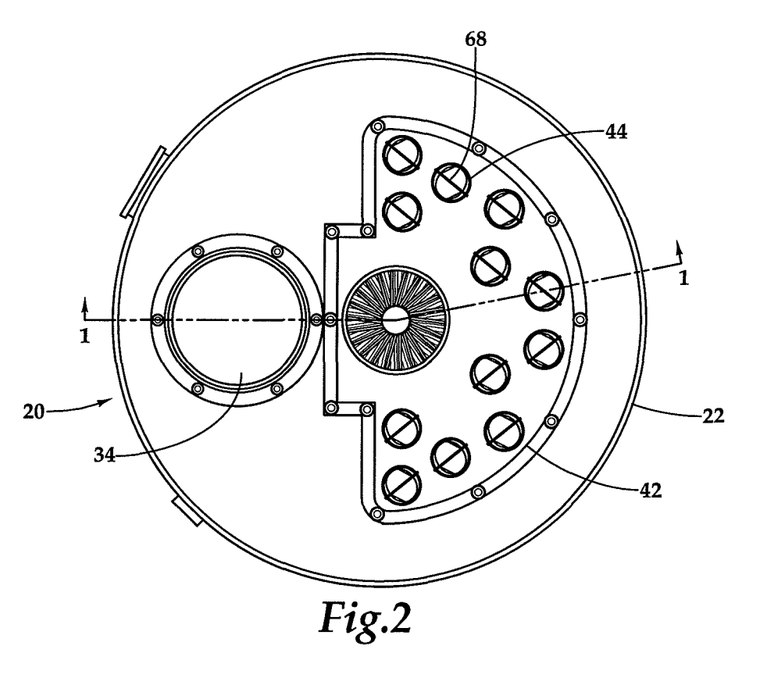
FIG. 2 is a top view of the condensing water heater of FIG. 1 showing the location of a temperature sensor.
Figure 3:
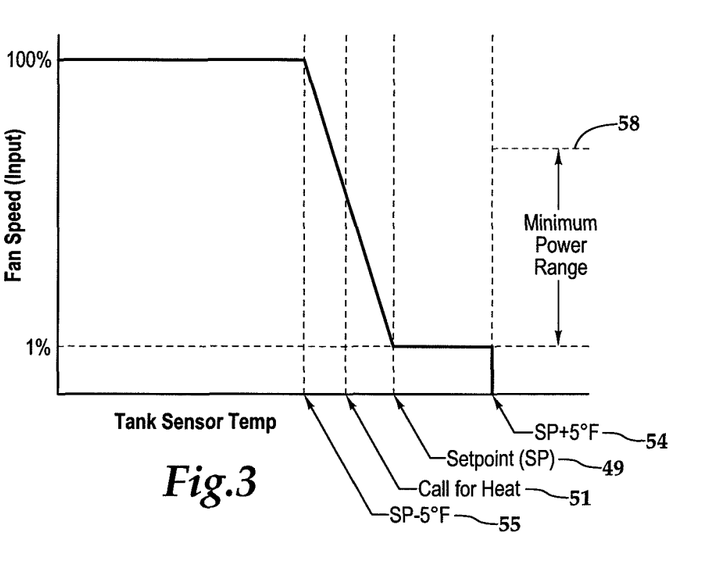
FIG. 3 is a schematic view showing how to control the burner minimum power setting to prevent water condensation in the first and second flues.
Figures 4, 5:
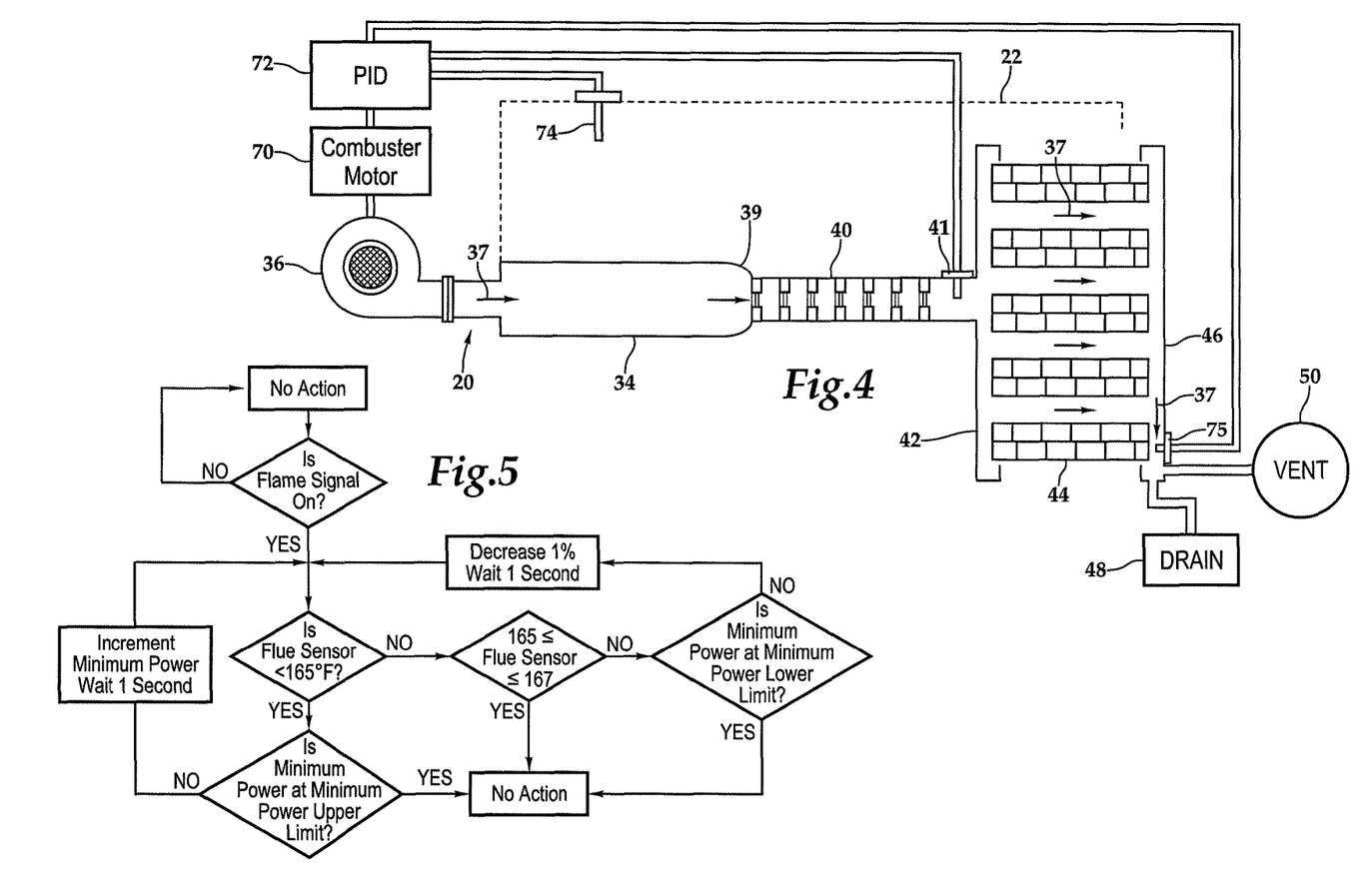
FIG. 4 is a schematic view for the three types of flues and the location of the temperature sensor used to prevent condensation in the first and second flues.
FIG. 5 is a flow diagram of the modified control system of the water heater illustrated in FIGS. 1-2.

Referring more particularly to FIGS. 1-6 wherein like numbers refer to similar parts, a water heater 20 is shown schematically in FIG. 1. The water heater has a tank 22 formed of a mild steel cylindrical outer shell 24 to which are welded two circular domes, comprising an upper dome 26, and a lower dome 28. Mounted below the water tank 22 is a downward continuation of the outer shell which is a cylinder forming a stand 32. Three types of cylindrical flues or heat exchanging pipes, a first flue 34, second flue 40, and one or more third flues 44 arranged between the upper dome 26 and the lower dome 28 within the water tank 22 such that the axes of the flues are parallel to an axis defined by the outer shell 24 of the tank. A power burner 36 is mounted to the first flue 34 and is fired downwardly from the upper dome 26. The burner 36 has a fan (not shown) driven by a motor 70 as shown in FIG. 4. The speed of the motor 70 drives the fan to supply approximately 20%-30% excess combustion air i.e., above stoichiometric, to burn with a fuel to form combustion gases 37, as indicated in FIG. 1. The combustion gases 37 flow downwardly through the first flue 34. The combustion gases are transferred from the first flue 34 via a connector 29 to the second flue 40 which extends upwardly in the water tank 22 to the upper dome 26. The connector 29 as shown in FIG. 1 has a lower boat shaped part 43 which is approximately the lower half of a frusto-conical section with spherical ends of different sizes, each larger than the corresponding first flue 34 and second flue 40. The connector 29 is completed by flat plate or deck 45 which has holes sized to receive the first flue 34 and the second flue 40 as shown in FIG. 1.

A temperature sensor 41 as shown schematically in FIGS. 1 and 4 is located at the top of the second flue 40 to detect flue wall temperatures of the coldest part of the second flue wall, which determines if condensation will form. The second flue connects to a first junction box 42 mounted to the upper dome 26. The junction box 42 connects to the tertiary condensing flues 44 in which the combustion gases travel downwardly to a second junction box 46 which connects the tertiary flues to a condensate drain 48 and an exhaust vent 50. The temperature sensor 41 is connected to a controller 72 which controls the burner 36.

The operational arrangement of the principal components of the water heater 20 are shown arranged schematically in FIG. 4. Beginning on the left side of FIG. 4 the power burner 36 is shown connected to the drive motor 70 which is connected to a Proportional Integral Derivative controller (PID) 72 which is in turn connected to a temperature sensor 74 which senses the temperature of the water in the tank 22. The PID controller 72 also is connected to the temperature sensor 41. The temperature sensors 41, 74 together with the PID controller 72 are used to control the motor 70 which in turn controls the fan speed of the burner 36. The burner 36 is of the type that draws a vacuum which automatically draws in the gaseous fuel in proportion to the burner air provided by the burner fan (not shown). Thus the control of a single variable, namely motor speed, controls the amount of air and the amount of combustion gases passing through the burner 36, and so controls the heat output of the burner 36.

A typical burner used to fire a water heater is described in U.S. Pat. No. 8,807,093 issue date Aug. 19, 2014 which is incorporated herein by reference. PID controllers form a generic control loop feedback by continuously calculating an error value e(t) as the difference between a desired setpoint and a measured process variable i.e., temperature, and applies a correction of the motor speed based on the proportional, integral, and derivative terms to minimize overshoot of the setpoint and system oscillation.

The setpoint is set by the user or may be factory set, and the temperature of the water is measured by water temperature sensor 74 in the water tank. The PID is programmable and is used to turn the burner on and adjust its heat output. For lighting the burner there is an ignition power setting, the burner also has a maximum power setting for rapid temperature recovery, and a minimum power setting which is used for maintaining the temperature when the water temperature is near the setpoint. In a typical case when the temperature falls a small amount e.g., 3-4° F., the burner is lit at the ignition setting and then proceeds to the minimum power setting, if this is different from the burner ignition setting. The PID controller using the Proportional Integral Derivative values then controls the power setting in a closed loop to bring the water temperature to the setpoint plus an overshoot value to prevent cycling the burner on and off frequently. If the water temperature falls a greater amount e.g, 5-6° F. the burner is fired at the maximum power setting until the water temperature is within a range between the—setpoint minus a P-value—and the setpoint, at which point the burner can modulate, i.e., smoothly changing the motor output, between maximum and minimum power. The P-value is a proportional function which is a settable input in the PID controller and will be a temperature offset value e.g., 3-4° F. When the water temperature is equal to or greater than the setpoint, but less than an overshoot value, the burner is fired at the minimum power setting.

In the water heater 20 the combustion gases travel from the power burner 36 through the flues 34, 40, and 44 to heat water 52 contained within the tank 22 by exchanging heat with the walls of the flue. The first flue 34 is without fins on the inner surface 57 of the flue. The first flue 34 is typically greater in diameter than the second flue 40. The second flue 40 has fins 62 welded to its inner surface 59, and is in turn typically greater in diameter than the third flue 44 used to extract the heat by condensation of water vapor in the combustion gases 37. The diameter of the sequence of flues, decreases as the temperature of the flue gases decrease in accord with the ideal gas law (pV=nRT). As an example of flue diameters in a 130 gallon water heater which is fired at a rate of up to 500,000 BTUs per hour, the first flue 34 may be 8 inches in diameter, the second flue in the same water heater may be 6 inches in diameter. A plurality of third flues 44, having collectively a relatively large total area may be used so the combustion gases slow down, to provide more time and surface area to facilitate condensation of water vapor e.g., twelve 2 inch diameter third flues. In the arrangement of the first, second and third flues, 34, 40, 44 it is desirable that the third and final flues 44 be arranged so that the combustion gases flow downwardly, so that condensation which forms on the walls 54 of the third flues, and within the flow of combustion gases moves, downwardly to the condensate drain 48.

When the burner is fired at maximum power or the minimum power upper limit the combustion gases do not start to condense water until they reach the third flues 44. However, the burner if fired at low levels, e.g., when there is less or no demand for hot water at a given time, may begin to condense water in the secondary flue 40 or even the first flue 34. Such condensation will drain down into the connector 29 and sooner or later restrict the flow of exhaust gases such that the burner 36 will shut off or will not start.

To prevent blocking the flow of exhaust gases through the connector 29, the burner 34 power setting is controlled by the PID controller 72 shown in FIG. 4 so as to prevent condensation of water in the first 34 or second 40 flues by maintaining the temperature of the second flue inner surface 59 at a dew prevention point, above the dew point at the exit of the second flue 40. The sensor 41 is located at the top of the second flue 40 where the wall inner surface 59 of the second flue has tank water on its outside surface. Condensation is prevented by maintaining the second flue inner wall at or above a dew prevention setpoint e.g., at 165° F. The dew prevention point is at or above the dew point of the combustion gases 37 and can be calculated or experimentally determined so as to reliably prevent condensation in the second flue in the water heater 20. For example, maintaining the wall inner surface 59 at a temperature of 1-10° F. or 10 to 100° F. above the dewpoint of the partial pressure of water vapor in the combustion gases at the flue temperature sensor 41.

Referring to FIG. 5 an improved control system is incorporated in the PID controller 72 by adding the flue sensor 41 input to the PID controller, which already is connected to the tank water temperature sensor 74 and to a flame sensor 76. If a flame is present between the flame sensor and earth ground, the current generated by a supplied AC voltage will be rectified to DC current and be sensed by the controller 72. If the setpoint is variable by the user the PID controller is also connected to a setpoint setting input 49. The PID may also be programmed to establish a minimum power upper limit setting.

If a flame is present output of flue sensor 41 is checked to determine if the flue sensor temperature output is less than the flue dew prevention point e.g., 165° F. If the flue sensor 41 temperature output is less than flue dew prevention point e.g., 165° F. and the burner power setting is at the minimum power upper limit or at maximum power the flue will soon be over the flue dew prevention point and no action is taken. Wherein the flue dew prevention point is a selected temperature such as 1-10° F. or 10-100° F. above the dew point at the flue sensor 41. When the burner minimum power setting is less than minimum power upper limit and the flue sensor temperature output is less than the flue dew prevention point e.g., 165° F. the minimum power setting is stepped up by 1% and after 1 second the flue sensor output is again checked. When the burner minimum power setting is less than the minimum power setting upper limit and the flue sensor 41 temperature output is greater than the flue dew prevention point e.g., 165° F., and less than or equal to a flue sensor output overshoot temperature (e.g., 167° F.) no adjustment to the power setting is made. If the output of the flue sensor 41 is above the flue sensor output overshoot temperature then the burner rate is checked and if it equals the minimum power lower limit, no action is taken. If the burner rate is greater than the minimum power lower limit then the rate is stepped down by 1% and after 1 second the flue sensor output is checked and the control loop is repeated as long as the burner is on.

The main program in the PID controller continues to operate according to the prior art turning on the burner at the ignition setting when the setpoint sensor falls below the call for heat temperature 51 and to maximum power setting i.e., 100% when the setpoint sensor output falls below setpoint by a selected increment e.g., SP-5. The fire rate will modulate i.e., controlled, between the maximum power setting and the minimum power setting when the water temperature is within a range between the—setpoint minus a P-value— and the setpoint. When the water temperature is equal to or greater than the setpoint, but less than the overshoot value, the burner is fired at the minimum power setting. Functionality of the PID controller is not changed unless the flue sensor 41 output falls below the flue dew prevention point wherein the control logic of FIG. 5 is activated to modulate the burner rate to prevent condensation on the second flue wall 59 and maximize fuel efficiency by turning up or down the burner until the preexisting PID logic turns off the burner.

Figure 6:
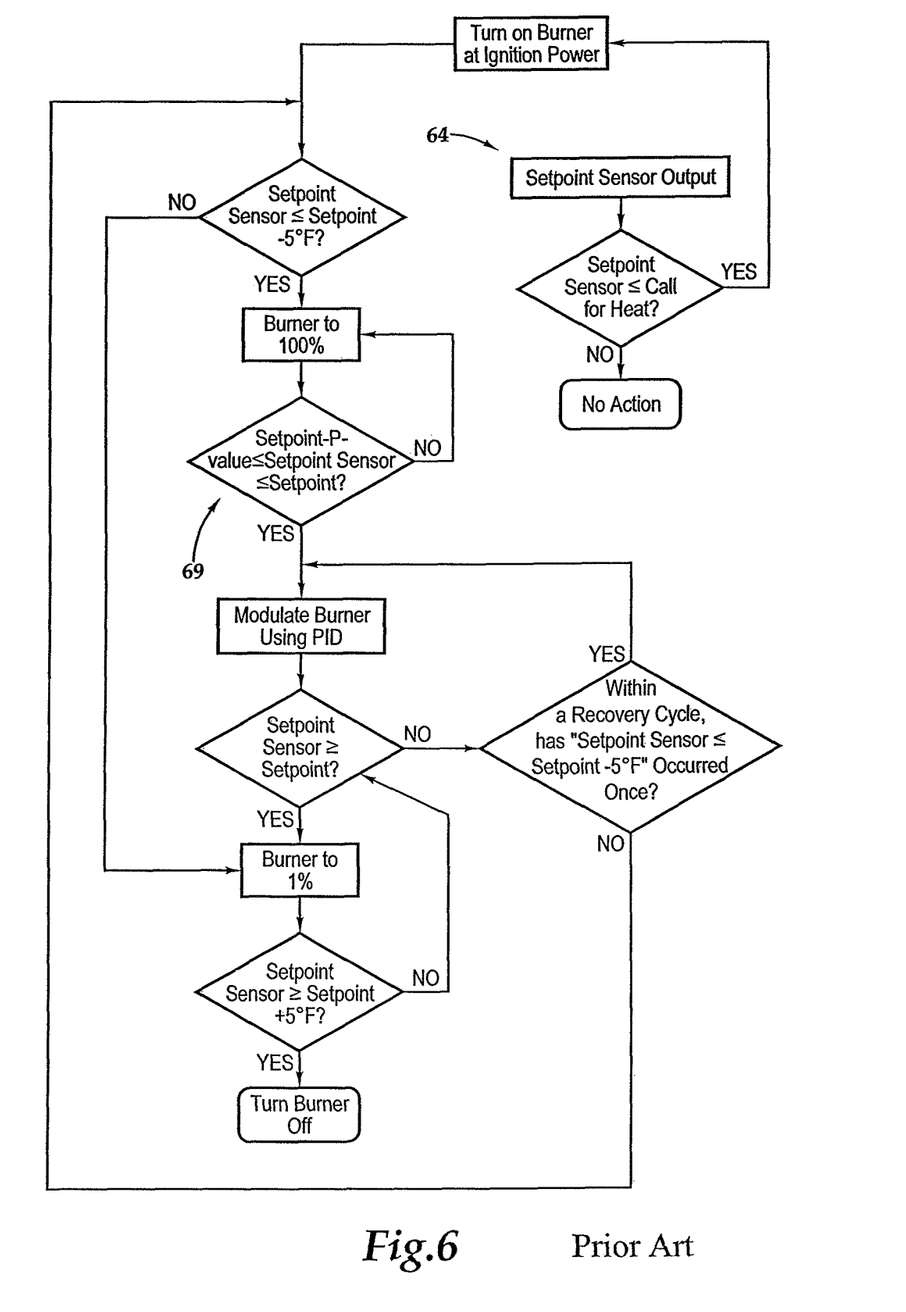
FIG. 6 is a flow diagram of the unmodified control system of the water heater illustrated in FIGS. 1-2.

Referring to FIG. 6 the prior art control system is illustrated. When the temperature in the water tank 22 falls below the setpoint input setting (SP) 49 (e.g., 130° F.), by a first temperature drop (e.g., 3.6° F.), to a call for heat point 51, the burner 36 is turned on at ignition power, if the setpoint sensor 74 output falls below the setpoint by a second temperature drop 55 (e.g., setpoint −5° F. or 125° F.), the burner fires at the maximum power setting until the setpoint sensor 74 output is within a range between the—setpoint minus the P-value—and the setpoint, at which point the burner will modulate between maximum and minimum power. When the water temperature is equal to or greater than the setpoint, but less than the overshoot value, the burner is fired at the minimum power setting.

Unless the minimum power setting of the burner is below the minimum power setting upper limit and the flue sensor 41 output drops below the dew prevention point (e.g., 165° F.) or flue sensor 41 output exceeds the flue sensor output overshoot temperature (e.g., 167° F.) and the fire rate exceeds 1%, the control loop of FIG. 5 does not affect the minimum power setting.

A third sensor 75 shown in FIG. 4 may be employed in the second junction box 46 to assure the gases leaving the junction box are at or below a temperature selected for safety. If the output of the third sensor is above the safe temperature (e.g., 140° F.), the burner is turned off. In certain fault situations, for example, where some of the baffles in the third flues are missing or for other reasons, the temperature of the exhaust gases leaving the third flues and flowing into the second junction box 46 are such that a plastic (e.g., PVC) exhaust tube vent 50 as shown in FIG. 4 may exceed a safe working temperature i.e., a temperature at which the plastic exhaust tube 50 might eventually fail. For example for PVC the maximum recommended working temperature is 140° F. for non-pressurized pipe.

The twelve third flues 44 are designed to achieve heat recovery by condensing water vapor in the combustion gases 37. As shown in FIG. 1, the combustion gases 37 from the second flue 40 empty into a first shallow junction box 42 welded to the upper dome 26 of the tank 22 as shown in FIG. 1. The first junction box 42, may see some condensation, and so is insulated externally. The twelve third flues 44 have their combustion gas receiving outlet ends 67 extending into the first junction box 42. The third flues 44 are arranged in relation to the second flue 40 so that the plenum formed by the junction box 42 relatively evenly distributes the combustion gases 37 to each of the third flues. The third flues 44 are designed to have identical or nearly identical flow characteristics so that the flow of combustion gases 37 approximates an even split between all the third flues. Because liquid water is present in the condensing third flues 44, the flues are lined with glass i.e. a porcelain enamel coating, and the third flues are preferably formed of cold drawn mild steel because enamel coating adheres well to cold drawn mild steel. In the third flues 44 stainless steel baffles 68 are hung from the combustion gas receiving ends 67 of the third flues as shown in FIG. 1, to increase turbulence within the third flues. The baffles extend axially within the third flues and have regular radially extending projections which deflect the combustion gas flow casing turbulence which aids in condensing the water.

The third flues 44 empty into the second junction box 46 which slopes downwardly and outwardly of the tank 22 such that condensation water drains to the drain 48. The gases proceed through an exhaust vent 50 and exit the building in which the water heater is located.

The combustion gas temperature entering the first junction box 42 is controlled to be at least above the dew point, and the amount of heat recovered from condensation depends on how much the temperature of the combustion gas can be reduced in the third flues 44. The exit temperature (e.g., 100° F.-130° F.), of the combustion gases 37 from the condensing tertiary 44 is controlled by the temperature of the water 52 within the tank 22, particularly at the bottom of the tank where a cold water inlet is located. The cold water inlet is typically located at the bottom of the tank either directly or by a pipe in the tank which takes the cold water from the cold water inlet to the bottom of the tank 22. The hot water outlet is connected to the top of the water heater tank 22, where the hot water, being less dense, rises to the top of the tank. When hot water is withdrawn, cold water enters the tank 22 and eventually the burner 36 is turned on in response to the temperature drop sensed by the water temperature sensor 74 as shown in FIG. 4. So when the burner is on, if cold water is being introduced into the tank bottom it facilitates greater condensation in the flues 44. The normal setpoint of the water heater 20 may be 130° F. and yet the exit gases may be cooled below 100° F. by the incoming water which in the mid-latitudes comes from a well or buried pipes, at a ground temperature in the neighborhood of 50-60° F.

It should be understood the critical temperature for condensation depends on fuel used i.e., the fuels C:H ratio, for powering the water heater. Natural gas which is substantially methane ($CH_4$) has a carbon hydrogen ratio of about 1:4 other fuels such as propane ($C_3H_8$) have a 3:8 (1:2.67) ratio and No. 2 heating oil (~$CH_{2.1}$) has a ratio of approximately 1:2.1. The amount of water vapor in the exhaust thus depends on the fuel type and so the temperature at which condensation forms also depends on the fuel type. The temperature at which dew forms in the exhaust gases depends only on the partial pressure of the water vapor in the exhaust. Knowing the fuel type i.e., C:H ratio, and the excess air percentage, the partial pressure of the water vapor can be calculated and thus the dew point can be known for the combustion gases from a particular fuel. The known dew point for a given fuel and excess air percentage used in combustion can be used to program the controller 72 so as to control the power setting of the burner to keep the temperature of the exhaust gases above the dew point at the location of the sensor 41 which is placed at the junction between the condensing and non-condensing parts of the water heater flue or heat exchanger.

The locating of a flue temperature sensor in the water heater flue at a location between the non-condensing part and the condensing part of the flue in the claims shall be understood to include placing the flue temperature sensor on a portion of the condensing flue which is most likely to condense water i.e., the coldest part of the flue when the burner is on.

The temperatures at which control events are triggered and the interval between them are by way of example and it will be understood that the temperature selected will vary for a given water heater design.

It should also be understood that various burner types, various fuels and various flue configurations can be used with the claimed control system and method to control the location where the dew point is reached in a water heater.

It is understood that the invention is not limited to the particular construction and arrangement of parts herein illustrated and described, but embraces all such modified forms thereof as come within the scope of the following claims.

We claim:

1. A method in a water heater, of controlling a water heater burner which has an adjustable power setting and, wherein the burner fires into a non-condensing part of a flue, the flue also having a condensing part, preventing condensation of water in the non-condensing part with the controller, comprising the steps of:

locating a flue temperature sensor in the flue at a location between the non-condensing part and the condensing part of the flue;

detecting a signal from a flame sensor that the burner that fires into the non-condensing part of the flue is on, so that the burner produces flue gases that travel through the water heater flue, and while the burner is on performing the steps of:

monitoring the output of the flue temperature sensor and determining if the flue temperature sensor output exceeds a selected temperature above a dew point of water vapor in the combustion gases at the location of the flue temperature sensor;

increasing the burner power setting if the flue temperature sensor output is below the selected temperature above the dew point and the water heater burner is at a setting less than a minimum power upper limit.

2. A method in a water heater, of controlling a water heater burner which has an adjustable power setting, wherein the burner fires into a non-condensing part of a flue, the flue also having a condensing part, preventing condensation of water in the non-condensing part, comprising the steps of:

locating a flue temperature sensor in the flue at a location between the non-condensing part and the condensing part of the flue;

detecting a signal from a flame sensor that the burner that fires into the non-condensing part of the flue is on, so that the burner produces flue gases that travel through the water heater flue, and while the burner is on performing the steps of:

monitoring the output of the flue temperature sensor and determining if the flue temperature sensor output exceeds a selected temperature above a dew point of water vapor in the combustion gases at the location of the flue temperature sensor;

wherein the burner has a minimum power range extending from a minimum power lower limit to a minimum power upper limit, wherein if the output of the flue temperature sensor is less than the selected temperature above the dew point, and the water heater burner is at a setting less than the minimum power upper limit, increasing the burner power by a first incremental step and waiting a first selected interval of time;

if the output of the flue temperature sensor is greater than or equal to the selected temperature above the dew point and less than or equal to the selected temperature above the dew point plus an overshoot value, taking no action;

if the output of the flue temperature sensor is greater than the selected temperature above the dew point plus the overshoot value, and if the water heater power is equal to the minimum power lower limit taking no action; and if the output of the flue temperature sensor is greater than the selected temperature above the dew point plus the overshoot value, and the power setting is greater than the minimum power lower limit decreasing the burner power by a second incremental step and waiting a second selected interval of time.

3. The method of claim 2 wherein the first incremental step and the second incremental step are the same, and wherein the first selected interval of time and the second selected interval of time are of the same length.

4. The method of claim 3 where the first incremental step and the second incremental step are 1% of a maximum power setting and the first selected interval of time and the second selected interval of time are 1 second.

5. The method of claim 2 wherein the step of locating the flue temperature sensor in the water heater flue at the location between the non-condensing part and the condensing part of the flue, further comprises placing the flue temperature sensor to measure an inside surface of a portion of a wall of the non-condensing part of the flue which is closest to the condensing part of the flue and said portion has an outside surface still in contact with water in a water tank.

6. The method of claim 2 wherein the selected temperature above the dew point is 1-10° F. above the dew point of the partial pressure of water vapor in the combustion gases at the flue temperature sensor.

7. The method of claim 2 wherein the selected temperature above the dew point is 10-100° F. above the dew point of the partial pressure of water vapor in the combustion gases at the flue temperature sensor.

8. The method of claim 2 wherein the selected minimum power upper limit of the burner is such that there is no condensation in the non-condensing flue within one minute of turning the burner on.

9. The method of claim 2 wherein the step of detecting the signal that the burner is on and the steps performing while the burner is on, are performed by a controller.

10. A water heater comprising:
a water tank having a lower dome and an upper dome, and a tank wall extending therebetween;
a first non-condensing flue defining a first flue wall, the first flue extending from the upper dome toward the lower dome, the first flue joining the upper dome to define an opening through the upper dome;
a burner mounted to the first flue so as to fire along the first flue;
wherein the first flue is connected to a second non-condensing flue by a 180 degree connector located within the water tank, the second flue defining a flue wall, the second flue extending from the connector to the upper dome, the second flue joining the upper dome to define a second flue opening through the upper dome, and the second flue defining an inner surface to which a multiplicity of radially inwardly extending metal fins are each attached by a weld, without extending through the second flue wall;
at least one third condensing flue extending from the lower dome to the upper dome and connected to the second flue by a junction box on the upper dome;
a setpoint temperature sensor located to sense a temperature of water contained within the water heater tank;
a flue temperature sensor located in the second non-condensing flue on an inside surface of a portion of the wall of the second non-condensing flue which is closest to the third condensing flue and wherein said portion has an outside surface arranged in contact with water when the water tank is filled;
a controller mounted to the water heater and connected in controlling relationship to the burner, the controller connected in temperature receiving relation to the setpoint temperature sensor and the flue temperature sensor and arranged to control a burner setting so that a temperature output of the flue temperature sensor is maintained above a dew point at which water would condense in the second flue, and to turn the burner on when the setpoint temperature sensor indicates water temperature in the water tank falls below a selected setpoint temperature;
wherein the burner has a minimum power range extending from a minimum power lower limit to a minimum power upper limit; and
wherein the controller is arranged to control the burner with input from the setpoint temperature sensor and the flue temperature sensor to heat and maintain water in the water tank within a selected temperature range without condensing water from operation of the burner until the third condensing flue.

11. The water heater of claim 10 wherein the 180 degree connector located within the water heater tank is formed of a lower boat shaped shell which is welded to
a flat plate which forms a deck for the shell, the shell having a first hole sized to receive the first flue and a second hole sized to receive the second flue, wherein the first flue is welded to portions of the deck surrounding the first hole and the second flue is welded to portions of the deck surrounding the second hole so that the first and second flue are connected by a space defined between the shell and the deck.

12. The water heater of claim 10 wherein there are a plurality of third condensing flues extending from the lower dome to the upper dome and connected to the second flue by the junction box on the upper dome and to another junction box on the lower dome, which slopes downwardly and outwardly of the tank such that condensation water drains to a drain.

13. A method in a water heater, the water heater comprising: a water tank having a lower dome and an upper dome, and a tank wall extending therebetween; a first flue defining a first flue wall, the first flue extending from the upper dome toward the lower dome, the first flue joining the upper dome to define an opening through the upper dome; a burner mounted to the first flue so as to fire along the first flue introducing combustion gases therein; wherein the first flue is connected to a second flue by a 180 degree connector located within the water tank, the second flue defining a flue wall, the second flue extending from the connector to the upper dome, the second flue joining the upper dome to define a second flue opening through the upper dome, and the second flue defining an inner surface to which a multiplicity of radially inwardly extending metal fins are each attached by a weld, without extending through the second flue wall; at least one third condensing flue extending from the lower dome to the upper dome and connected to the second flue by a junction box on the upper dome; a setpoint temperature sensor located to sense a temperature of water contained within the water heater tank; wherein the first and second flues comprise a non-condensing flue portion, and wherein a flue temperature sensor is located at a point in the water heater between the non-condensing flue portion and the at least one third condensing flue; a controller mounted to the water heater and connected in controlling relationship to the burner, the controller connected in temperature receiving relation to the setpoint temperature sensor and the flue temperature sensor and arranged to control a power setting of the burner to turn the burner on and off;
wherein the method comprises the following steps of controlling the water heater burner:
detecting a signal from a flame sensor that the burner is on, so that the burner produces flue gases that travel through the water heater flue, and while the burner is on performing the steps of:
monitoring the output of the flue temperature sensor and determining if the flue temperature sensor output exceeds a selected temperature above a dew point of water vapor in the combustion gases at the location of the flue temperature sensor;

wherein the burner has a minimum power range extending from a minimum power lower limit to a minimum power upper limit, wherein if the output of the flue temperature sensor is less than the selected temperature above the dew point, and the burner is at a setting less than the minimum power upper limit, increasing the burner power by a first incremental step and waiting a first selected interval of time;

if the output of the flue temperature sensor is greater than or equal to the selected temperature above the dew point and less than or equal to the selected temperature above the dew point plus an overshoot value, taking no action;

if the output of the flue temperature sensor is greater than the selected temperature above the dew point plus the overshoot value, and if the water heater power is equal to the minimum power lower limit taking no action; and if the output of the flue temperature sensor is greater than the selected temperature above the dew point plus the overshoot value, and the power setting is greater than the minimum power setting lower limit decreasing the burner power by a second incremental step and waiting a second selected interval of time.

\* \* \* \* \*